FIG. 1

INVENTORS
ROBERT J. S. BROWN
IAN R. MARLARKY
FRANCIS G. BLAKE

BY George W. Wasson
Harold D. Jesmer
ATTORNEYS

INVENTORS
ROBERT J. S. BROWN
IAN R. MARLARKY
FRANCIS G. BLAKE
BY
ATTORNEYS

3,529,282
METHOD FOR DETERMINING IN-LINE AND
CROSS DIP EMPLOYING CROSS STEERING
OF SEISMIC DATA
Robert J. S. Brown, 916 W. Fern Drive, Fullerton, Calif.
92633; Ian R. Marlarky, 674 Picaacho Drive, La
Habra, Calif. 90631; and Francis G. Blake, 17762
Calgary Ave., Yorba Linda, Calif. 92686
Filed Jan. 29, 1968, Ser. No. 701,145
Int. Cl. G01v 1/28, 1/20
U.S. Cl. 340—15.5        6 Claims

ABSTRACT OF THE DISCLOSURE

A method for collecting and processing seismic data to determine the attitude of strata below the surface of the earth. An array of seismic sources and detectors is arranged with respect to a survey line at the surface of the earth such that center points between all possible source and detector pairs form a uniform grid of center points that can be associated with a like grid of reflection points on the strata below the surface. Multitrace records of seismic traces are produced representing energy reflected from said strata after initiation of each seismic source individually. These traces are rearranged and then processed by a technique known as beam steering to produce traces of directional seismic data in planes perpendicular to the line of survey. One component of the attitude of subsurface strata can be determined by comparing the directional traces within any one plane. Another component of attitude can be determined by comparing directional traces from adjacent or nearby planes. Selected directional traces may be displayed to produce a representation of varying directional cross-section planes through the line of survey and the subsurface formations.

---

This invention relates to geophysical prospecing methods for exploring stratal configurations within an earth formation by means of seismic reflective techniques and, more particularly, to a method for collecting, processing, and then displaying areal seismic information found in multitrace seismic records in a form which permits true visualization of three-dimensional subsurface strata within the surveyed earth formation.

Conventional seismology works best when the structures being identified have their maximum depth variations in the direction of the line of the survey. The seismic techniques involved in the present invention are not so limited and have the additional advantage of being useful when the maximum depth variations run oblique or perpendicular to the line of the survey.

Today, geophysical prospecting crews commonly position an array of seismometers or geophones at the earth's surface to detect seismic waves from an explosion or other seismic sources at or below the surface of the earth, and record, as by means of a recorder or series of recorders electrically connected to the seismometers, the arrival of seismic waves as a function of time. The resulting seismic record is made up of a plurality of traces, the number of which corresponds to the number of geophone locations or geophone group locations used. The record usually is initially processed by applying static and dynamic corrections to the traces so that the resulting corrected record may be more easily interpreted by a seismologist to indicate the configuration of the underlying strata. The signals, or wavelets, appearing in the processed traces represent seismic waves arriving at the geophones from stratal seismic reflectors or other discontinuities within the earth. The manner in which each signal differs from, or is similar to, other signals along each trace, say as by time of arrival, magnitude and wave shape, or all three, allows inferences to be made as to identity of the underlying strata.

By noting the gradual change in arrival time from trace to trace of a signal representing reflections from a particular formation as one progresses along the line of survey, one can infer the subsurface elevational change of that particular formation in the direction of the line of survey. For example, if the particular formation seems to become shallower as evidenced by signals on a number of traces, and then seems not to change in elevation through a succeeding number of traces, and finally seems to become deeper again in a further succeeding number of traces, one can infer that the survey crossed an anticlinal structure. However, it will be appreciated that by collecting data along a single line of survey, one can fail to detect an anticline whose axis is parallel to that line of survey. This has been recognized to a certain degree in the prior art and methods have been proposed for assisting in the interpretation of the single line of survey data. One method of partially overcoming the deficiency has been to place an occasional set of geophones across, and preferably perpendicular to, the mean line of survey, and to gather auxiliary data that would permit determination of so-called cross-dips. In Hoover et al., U.S. 2,329,721 there is a disclosure of how data may be collected and processed to obtain cross-dips. The prior art schemes used the occasional cross-dip data merely as a control on the conventional process wherein a single cross section through the earth is depicted with a single survey line of data.

In one embodiment of the present invention, a line of geophones with regularly spaced crossing lines of shots is employed to give a uniform continuous distribution of subsurface coverage within a volume of the subsurface formations extending a significant distance to each side of the line of the survey. With this uniform subsurface coverage the seismologists are able to determine the in-line and cross-dips of the subsurface formations continuously at all positions along the line of the survey. With these dip data one can produce a three-dimensional picture of a subsurface structure even though the principal axis of the subsurface structure is oblique to the line of survey.

Furthermore, in all embodiments of the present invention, the final traces used to infer the subsurface structures not only represent those subsurface structures throughout a continuous finite volume, but the traces themselves, being produced by the method of beam steering and representing directional information within that volume, have signal-to-noise ratios several times higher than the original, conventional traces.

The field and office procedure in one embodiment of the present invention is as follows: A cross array of shots and inline array of geophones is arranged on the earth's surface so that the center points between each shot and each geophone will form a two-dimensional grid of center points. The center points will have a density of the order of 4 points per square wave length of the dominant seismic signals produced by the shots. Further, the shots and geophones will be preferably spaced so that the spread of the cross array is of the order of 10 wavelengths.

The shots will be shot separately and individual records of the signals produced at each of the geophone locations will be made so that there will be a separate trace for each geophone location. This will produce a total number of traces equal to the product of the number of shots and the number of geophone locations (or geophone group locations if several geophones are used in each group).

Each of the individual traces will then be statically and dynamically corrected so as to produce a trace which may be associated with its individual shot-geophone center point in the two-dimensional array.

Then, a subgroup constituting a group of traces representing center points in a line substantially perpendicular to the line of the survey will be processed, by a method known as beam steering, to produce a new set of traces representing directional information existing in the original subgroup of traces. The beam steering method is described in copending application of Lee P. Stephenson, Ser. No. 416,947, filed Sept. 25, 1964, for "Method for Processing Surface Detected Seismic Data to Plotted Representations of Subsurface Directional Seismic Data."

Each of the subgroups of traces, grouped by their cross relationship to the in-line survey direction, is likewise processed to produce its respective set of directional traces.

From these directional traces an indication of cross moveout for an event can be obtained. Further, when a group of directional traces from separate sets of directional traces is considered collectively, the in-line moveout (perpendicular to the cross moveout) of subsurface formations may be determined in an almost conventional manner, the difference being that the traces used may represent wavelets from specific directions out of the vertical plane through the line of survey, and more reliably represent the subsurface.

Selected directional traces may be displayed to produce a single profile representing the data derived from one cross array of shots into one line of geophones. Or, a group of these profiles may be assembled as a new form of selectively steered or tilted cross section representing coverage of the volume of subsurface formations extending significant distances to each side of the line of the survey but being displayable in a plane as if it were a conventional cross section.

The objects, features and advantages of the invention will be made apparent from the following detailed description taken in conjunction with the following accompanying drawings, in which:

FIGS. 7a and 7b illustrate one use of the processed records of FIG. 6; FIG. 7a is a perspective view of three sets of such processed records and FIG. 7b is a plan view of a possible subsurface earth formation that could have produced the records of FIG. 7a;

FIG. 11 is a cross section through the same earth formation depicted in FIG. 10 but produced by conventional seismic techniques;

Figure 2:
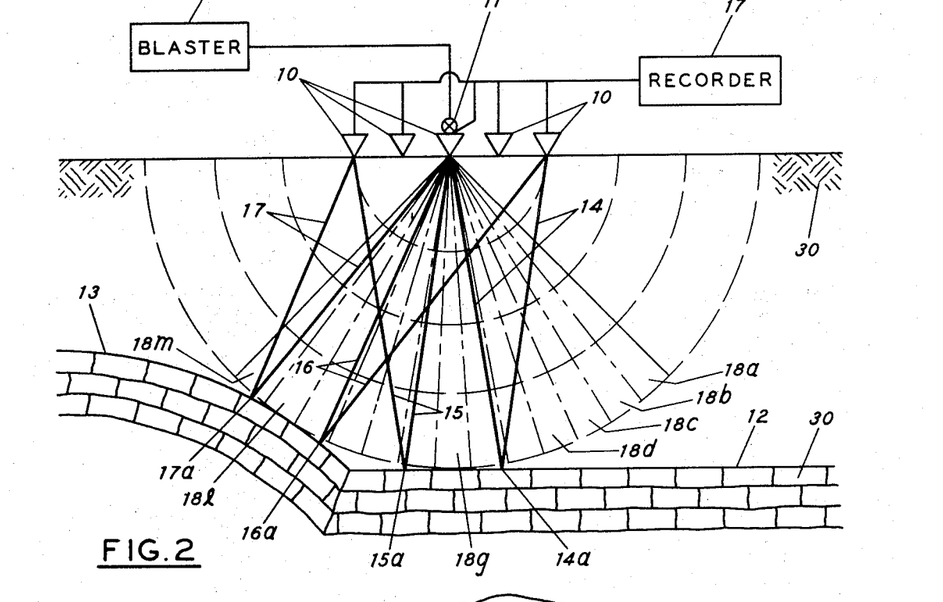
FIG. 2 is a sectional view of an earth formation illustrating a prior art method for obtaining a multitrace seismic record.
Figure 2:
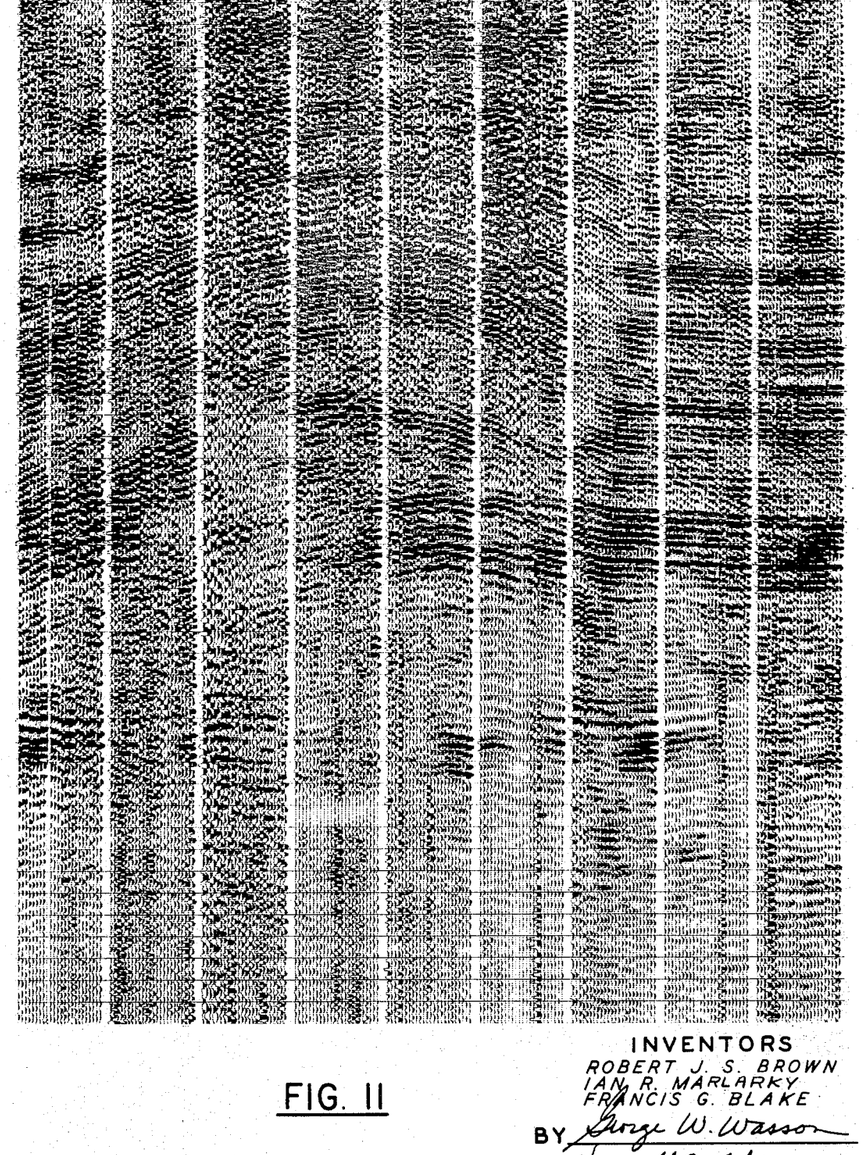

Reference should be made first to FIG. 2 illustrating the prior art scheme for collecting seismic data. As shown, the linear array of geophones 10 is positioned at the earth's surface. A seismic source 11 is located usually in line with the geophone array. When energized, as by blaster 9, the source 11 causes an omnidirectional, three-dimensional wave front to propagate from the source down through the earth. As variations in acoustic impedance are encountered within the earth, such as exist at reflecting horizons 12 and 13, portions of the energy are reflected to the earth's surface. Waves reflected from horizons 12 and 13 travel down up paths 14, 15, 16 and 17 after reflection from reflection points 14a, 15a, 16a and 17a, respectively. The geophones 10 convert the mechanical movement of the earth produced by the reflected waves to electrical signals. These signals are recorded by recorder 17 as a set of side-by-side traces representing amplitude versus time. The process is then repeated after the geophones and a new source are moved to a new spatial location along the earth's surface, usually aligned with the array of geophones at the previous survey site so as to provide a continuous line of survey across the earth's surface.

In analyzing and interpreting records produced from particular survey locations, trained seismologists desire to reduce the effect of interference or noise on the desired signals detected by the geophones. Traces within the records are sometimes collectively processed by summing to identify directionally distinct signals. That technique is known in the seismic art as "beam steering" as described in the aforementioned Stephenson application and constitutes a method wherein the group of geophones is treated as a steerable array by the introduction of suitable relative delays or advances to the traces produced by adjacent geophones. In the beam steering method, individual reflected signals appearing in the traces are identified with individual steering angles or scanning sectors such as sectors $18a$–$18m$ of FIG. 2.

The field procedures of the present invention differ from those employed in the prior art in that a plurality of sources is used with each geophone array so as to provide the desired additional subsurface coverage.

Figure 1:
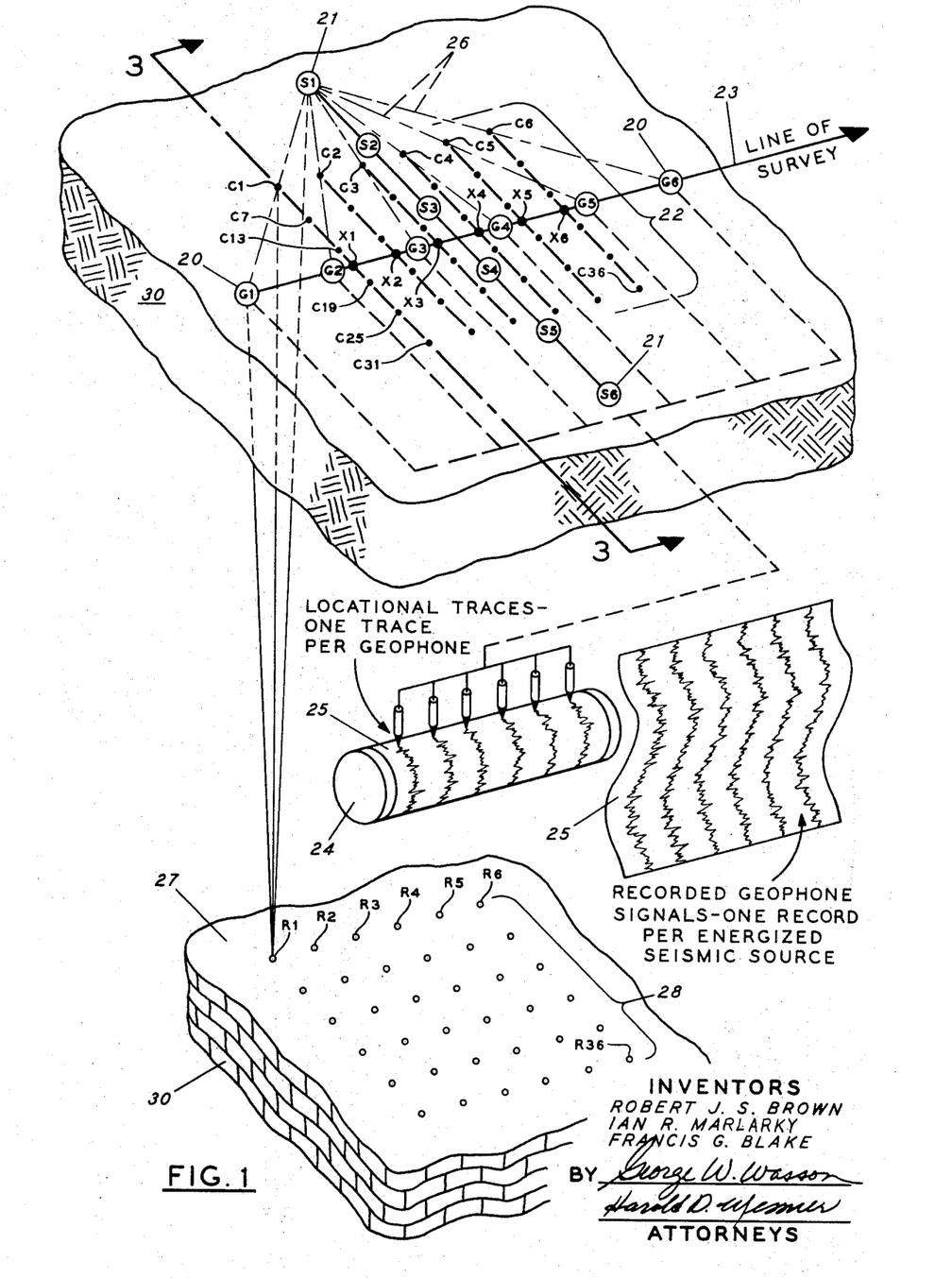
FIG. 1 is a perspective view, partially schematic, of an earth formation including a reflecting subsurface horizon illustrating the method of the present invention for obtaining a multitrace record whose traces are associated with individual center points between their respective sources and detectors, and are also associated with corresponding individual depth points within the earth.

Referring now to FIG. 1, geophones $G_1$–$G_6$ of the array 20 are illustrated as being spaced apart in linear alignment along the line of survey 23 to receive seismic energy from transversely aligned seismic sources $S_1$–$S_6$ of the seismic array 21.

To provide records indicating the arrival of reflected seismic energy, geophones $G_1$–$G_6$ connect, through amplifying equipment not shown, to recording heads of recorder 24 about which is wound record 25. The record 25 produced by the recorder 24 is a plurality of side-by-side time base traces of the signals produced at the geophones $G_1$–$G_6$. Each field record 25 is identified with the energy produced from a single source. A total of six field records of six traces each are produced by the geophones $G_1$–$G_6$ and the separately fired sources, $S_1$–$S_6$.

As a result of the arrangement of the source and geophone arrays, the trace produced by each geophone will represent reflections from locations half-way between an individual source and an individual geophone. The record of these traces produced by the array of geophones in response to actuation of a single source can be treated as though the reflections were received at a line of locations associated with center points parallel to and displaced from the line of the array of the geophones. For example, as shown in FIG. 1, the center points $C_1$–$C_6$ are associated with traces produced from source $S_1$ and are at the midpoints of imaginary lines 26 between the source and the geophones $G_1$–$G_6$.

Where the spacings between sources $S_1$–$S_6$ and the geophones $G_1$–$G_6$ are equal, any four adjacent points marking the intersection of any two adjacent parallel in-line grid lines with any two parallel transverse grid lines determine a density of center-point locations.

It is a preliminary working convenience in interpreting seismic data to think of all the reflecting points represented on a seismic trace as being points along a vertical line proceeding downward from the center point between the shot and geophone. After the conventional normal moveout corrections are made, it becomes reasonable also to think of each trace as if it had been made by a source and a geophone, both of them located at the respective center point.

Other corrections are frequently required to give the seismic trace the desired positional alignment with respect to its neighboring traces. The signals represented along a seismic trace must be related to a horizontal datum plane so that vertical distances may be determined with respect to a single horizontal reference. Sometimes the source and geophone are not at the same elevation and it therefore becomes necessary to adjust the reference time of the seismic trace for that disparity. Such adjustments are known as static corrections.

The introduction of the above types of corrections is well known in the seismic art; one manner for introducing such corrections is shown in U.S. Pat. 2,838,743 of O. A. Fredriksson, for "Normal Moveout Correction with Common Drive for Recording Medium and Recorder and/or Reproducing Means."

After normal moveout and static corrections have been made to the traces, the signals in the traces may be related to reflection points, at depth, but along the previously mentioned lines in the vertical plane containing the survey line proceeding downward from the respective center points. To describe this step, it is helpful to consider the reflection of seismic energy from a hypothetical horizontal reflecting horizon in the earth, such as from horizontal reflecting horizon 27 in FIG. 1; in that figure it should be noted that the paths of travel of the seismic energy may be indicated by lines drawn between the energized source, say source $S_1$, and the receiving geophone, say geophone $G_1$. The reflection points or areas of reflection on the horizon 27 coincide in space with vertical projections of the surface center points $C_1$–$C_{36}$. For example, reflection points $R_1$–$R_6$ are vertical projections of the surface locations $C_1$–$C_6$. Accordingly, the pattern of reflection points forming grid 28 can be identical with that of the center points forming grid 22 when the reflector is parallel to the surface.

For the working convenience of the present invention all of the traces produced by different source and geophone combinations are subjected to the appropriate individual corrections so that they may be considered to represent signals derived from reflecting points as if the shot-geophone combinations were all at their respective center points in a common datum plane. As illustrated in FIG. 1, the corrected traces then represent signals as they would have been detected at the surface grid center points $C_1$–$C_{36}$ and the subsurface reflections can be considered as reflections from points like $R_1$–$R_{36}$. It should be understood that where there are dipping subsurface beds and variations in the velocity of transmission of seismic energy with depth the reflection points may not be vertically below the center points at the surface. However, for working convenience in the preliminary steps of interpretation of the seismic data, the traces are treated as though they were derived from the center point locations as shown in FIG. 1.

The operating concepts of the method of the present invention may be described with reference to FIGS. 3 and 4 and FIGS. 6 and 7. These figures diagrammatically illustrate the improvements in collecting, processing and displaying seismic information accomplished by the method of the present invention.

Figures 3, 4:
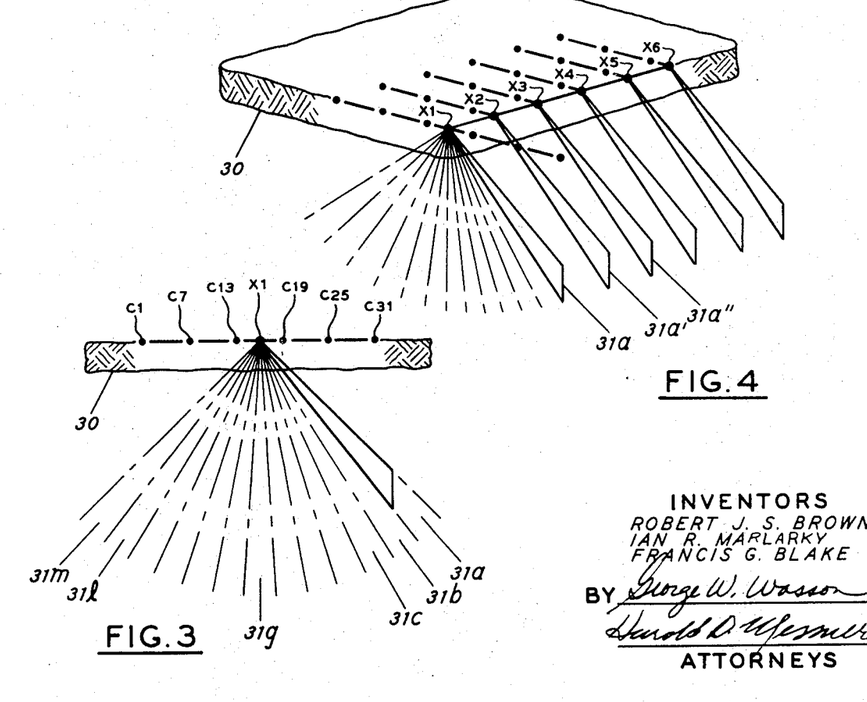
FIG. 3 is an elevational view of the earth formation taken along line 4—4 of FIG. 1 schematically illustrating the sectors through an earth formation that can be investigated by directional traces having a common in-line position.
FIG. 4 is a perspective view, partially in section, of the earth formation taken along a vertical plane containing the line of survey of FIG. 2.

FIG. 3 shows a set of center points $C_1$, $C_7$, $C_{13}$ . . . $C_{31}$ selected out of all the center points $C_1$ to $C_{36}$ of FIG. 1, in which figure all points of the set $C_1$, $C_7$, $C_{13}$ . . . $C_{31}$ had the common in-line coordinate $X_1$. They were on a line perpendicular to the line of survey 23. FIG. 3, represents an elevational view of the earth cut by a vertical plane through that line at position $X_1$. It will now be appreciated by one having a knowledge of the beam steering process, described in copending application of Lee P. Stephenson, Ser. No. 416,947, already mentioned, that if the traces associated with center points $C_1$, $C_7$, $C_{13}$ . . . $C_{31}$, are beam steered, by imposing suitable progressive relative time delays among the traces, and then compositing the traces, a new set of traces will be produced. This new set of traces will be a set of directional traces, all of which will be associated with the in-line position $X_1$, and the individual ones of which will represent energy received from different individual directions in the earth. FIG. 3 represents these different directions as sectors $31a$ to $31m$ in the vertical plane perpendicular to the line of survey at position $X_1$.

FIG. 4 shows several sets of center points in lines perpendicular to the line of survey and indicates schematically how, by beam steering the traces associated with those sets of center points, several sets of directional traces may be produced, all of the directional traces in any one of the sets being associated with a common in-line position, but each of the individual traces in any one of the sets representing a different direction in the earth.

In accordance with the present invention, each selected group of center point traces is beam steered to permit the identification of reflection signals arriving at various transverse angles of emergence associated with the middle of the sectors shown in FIG. 3.

FIG. 4 illustrates an earth formation 30 in longitudinal section to schematically illustrate the steering of the aforementioned center point traces and the investigation of directionally distinct reflection signals within all of those traces. In FIG. 4 the steering sectors $31a$, $31a'$, $31a''$, etc., are selected groupings for $X_1$–$X_6$ and are shown as aligned side-by-side.

Figure 6:
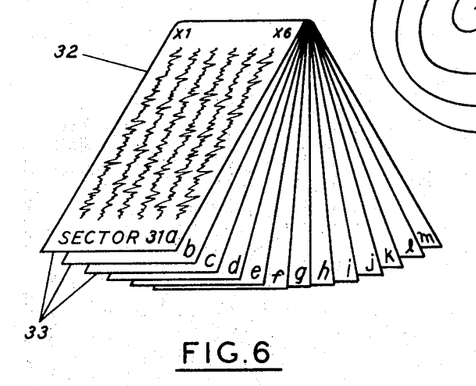
FIG. 6 is a perspective view of a set of processed records produced in accordance with the present invention.

FIG. 6 illustrates one form of useful display of the directional traces. In this display the directional traces having the same cross direction from each of the selected groups of center point traces are shown side-by-side and aligned according to their $X_1$–$X_6$ positions. All of the traces having the same cross direction then become one page of a record having as many pages as there are beam steered sectors being searched. In this form a book 32 of separate directional records is formed. The coherent wiggles on the traces of each page 33 of the book 32 can be visualized in three dimensions as representing signals from interfaces in space at the particular steering angle.

Large cross sections may be displayed in the manner of FIG. 6. Such a display allows a seismologist to view simultaneously all of the traces of the same angle of emergence along a cross section of the earth in the line of survey. The display may also constitute several subsets of traces with adjacent subsets making up the entire cross section. The adjacent subsets may then represent different angles of emergence. Accordingly, displays obtained in this manner can quickly and accurately provide generalized information about the configuration of sections of a surveyed earth formation both behind and in front of the vertical plane including the line of the survey.

Figure 7A:
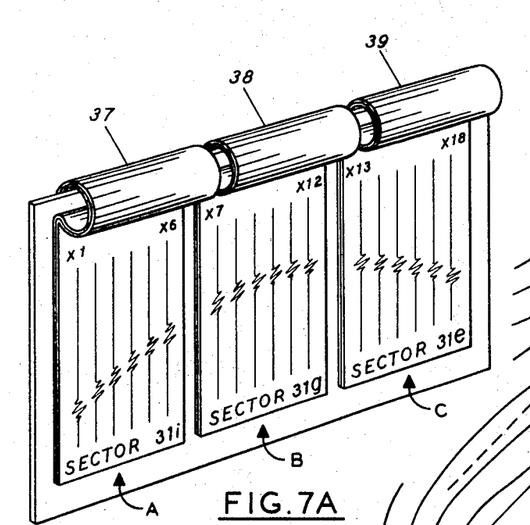
Figure 7B:
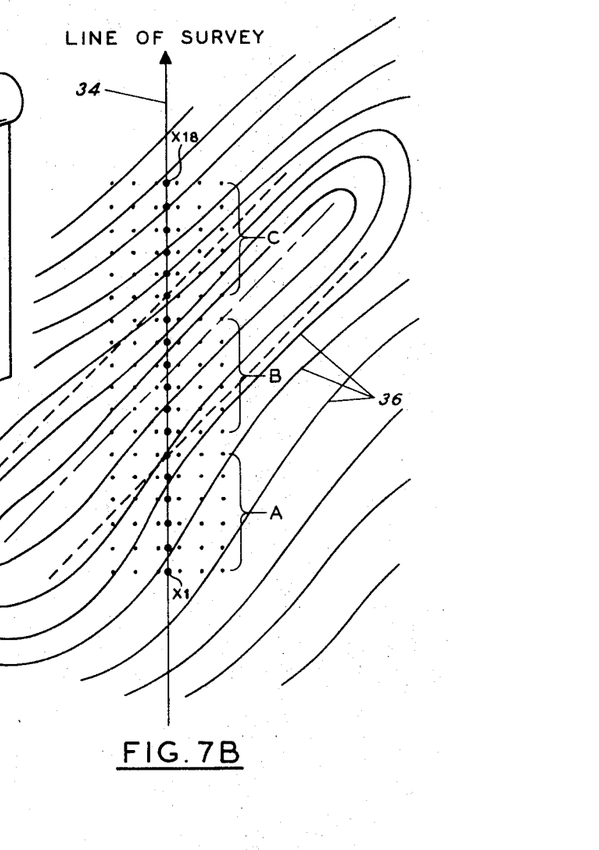

FIGS. 7a and 7b show a type of use of the records of FIG. 6. As here illustrated directional traces identified with locations $X_1$–$X_{18}$ along a survey line 34 have been produced. The locations $X_1$–$X_{18}$ are apparently above an anticlinal subsurface structure. The anticline is not aligned parallel to the survey line 34 but, as indicated by contour lines 36, is skewed with respect to a vertical plane through the survey line. To allow identification of the anticline, the individual records constituting the three sets, or subsets of records illustrated at 37, 38, 39, are scanned for maximum indications of events.

The identification of the same event in subsets or books 37, 38 and 39 can be established by associating signals having about the same time axis positions along the records. In FIG. 7a, the records of books 37, 38 and 39 have been scanned with the results as indicated. As shown, the same event can be followed through subsets of directional traces in the records so as to identify continuous configuration in an earth formation over a rather large survey area. Also, inferences about the strike and dip of the bed can be drawn from the apparent offset of the indicated events and the various angles of emergence as represented by the pages in the books.

Figure 8:
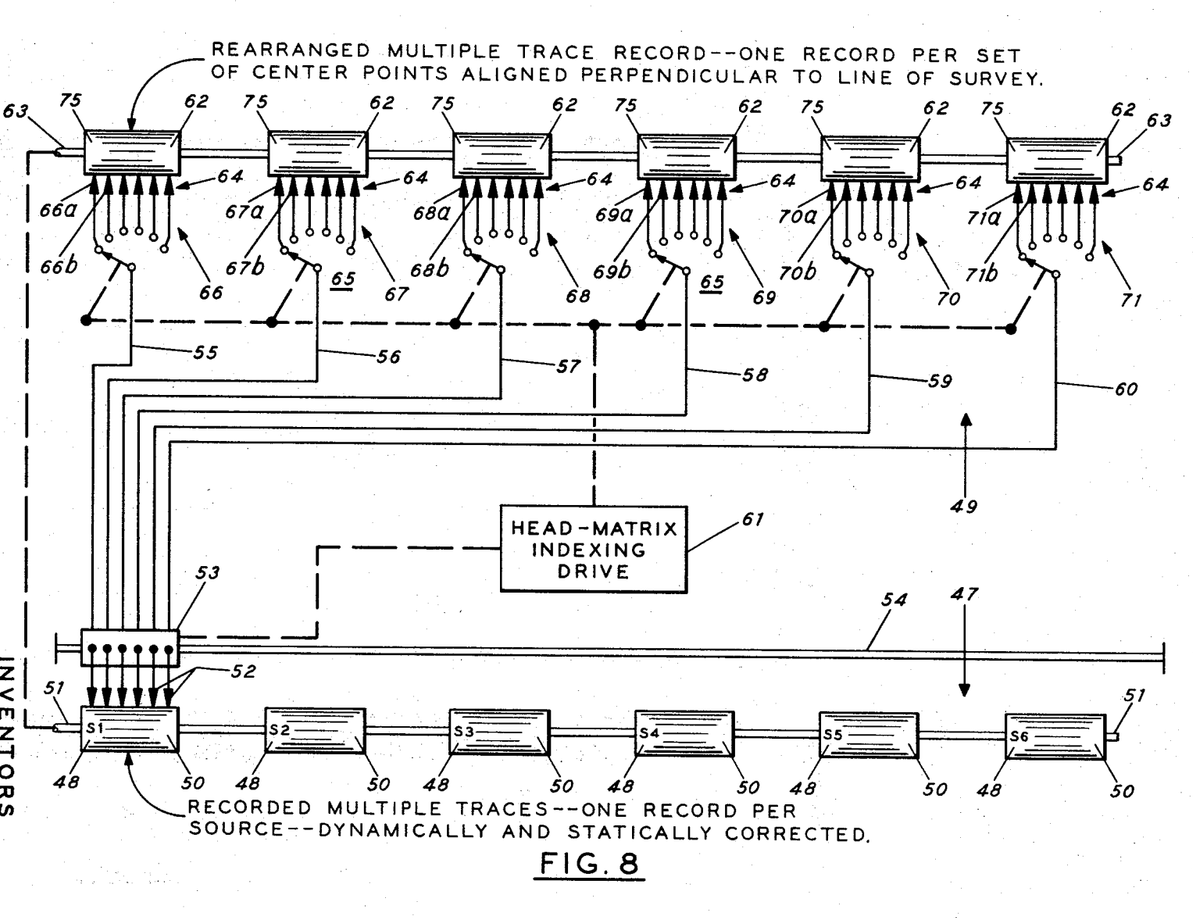
FIG. 8 is a block diagram of seismic data processing equipment for rearranging traces identified with the locations of FIG. 2, each resulting record containing side-by-side traces identified with a common in-line location.
Figure 9:
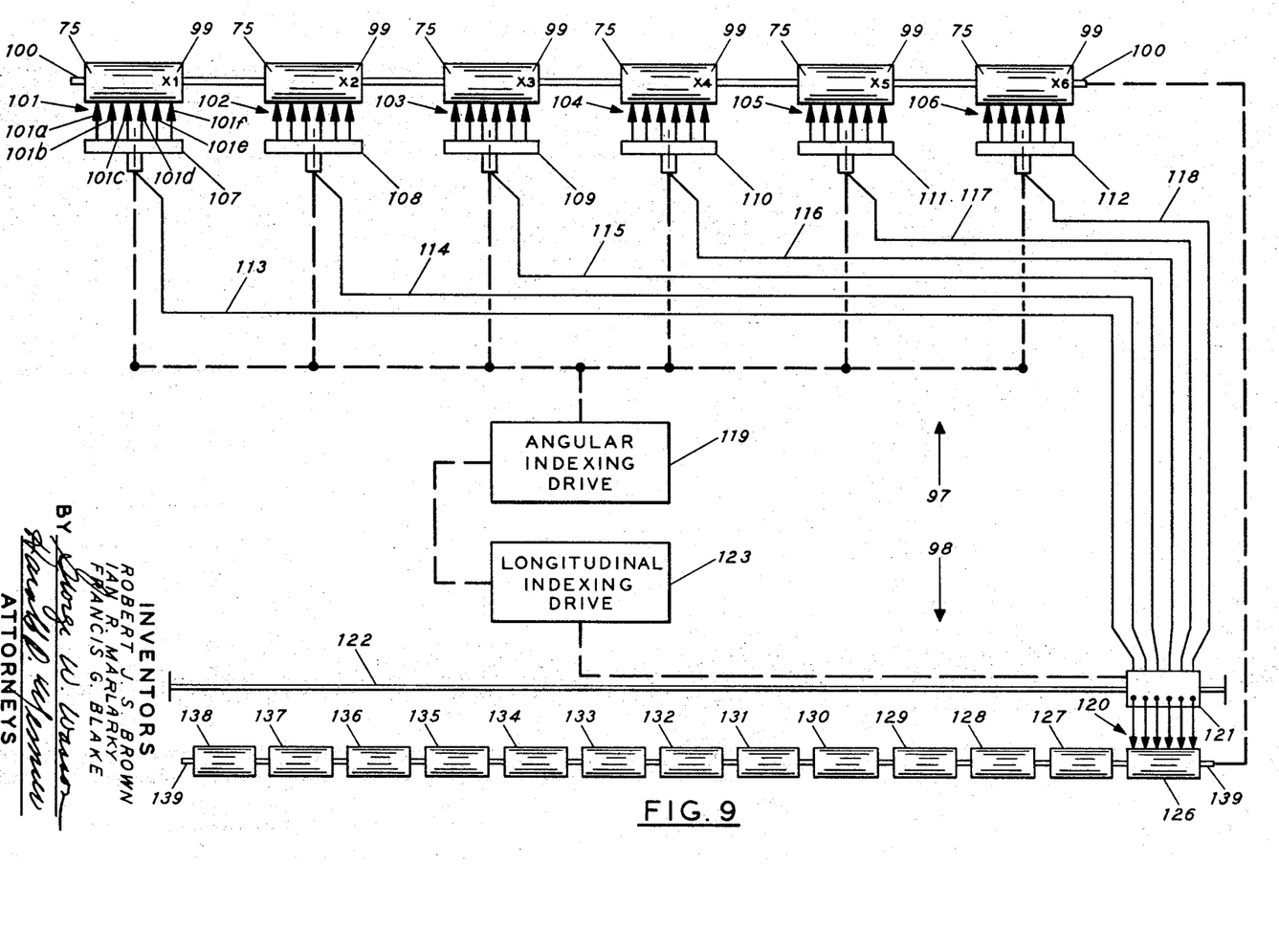
FIG. 9 is a block diagram of seismic data processing equipment for beam steering the resulting records produced by the equipment of FIG. 8 to produce directional traces and for rearranging the traces in one form of final display.

FIGS. 8 and 9 illustrate magnetic recording and playback equipment for performing the record processing steps in accordance with the method of the present invention. In the description which follows, the operation of the magnetic recording equipment should become apparent from the figures taken in consideration with the preceding description of this specification.

With specific reference to FIG. 8, there are illustrated separate magnetic recording systems at 47 and 49. Magnetic recording system 47 includes a series of drums 50 supported on a rotatable drive shaft 51 driven by a suitable mechanism, not shown. Actual record processing in accordance with the present invention requires careful speed control for rotation of the systems 47 and 49 as well as synchronism between the rotation of the drums and the movement of the magnetic heads. Each drum 50 is adapted for supporting a corrected seismic record 48, in the form of a magnetic tape. A plurality of individual magnetic pickup heads 52 is carried by head moving mount 53 slidably supported on bar means 54 for movement parallel to drive shaft 51. The individual pickup heads reproduce the traces of the corrected record 48 in the form of electrical signals and these signals are transmitted through conductors 55–60 as individual signals to the magnetic recording system 49. The head moving mount 53 is moved along bar means 54 by movement of a head-matrix indexing drive 61. After each complete rotation of the drums 50, indexing drive 61 is energized to cause one sideways step of movement of the head moving mount 53 to place the plurality of magnetic pickup heads 52 in alignment with the next corrected record 48.

The recording system 49 comprises a number of drums 62 mounted on shaft 63 driven in synchronism with shaft 51 of system 47. The drums 62 are suitably adapted to support a recording medium 75. The reproduced signals on conductors 55–60 are supplied to a matrix of recording heads 64 through a gang switch 65. The matrix 64 comprises a plurality of sets of recording heads 66–71 connected, respectively, to individual conductors 55–60, and each set includes a plurality of separate recording heads. By rotation of the gang switch 65 the conductors are selectively connected to separate recording heads within each set. The rotation of the gang switch 65 is so related to movement of the head moving mount 53 of system 47 that the gang switch is moved one step as the mount 53 is moved from one corrected record 48 to the next record.

The rearrangement of the trace format of the corrected record 48 may be understood if it is thought of as the record produced by source $S_1$ and geophones $G_1$–$G_6$. As shown in FIG. 8, the plurality of magnetic pickup heads 52 is positioned to reproduce the traces of the record as electrical signals while gang switch 65 is so arranged as to connect recording heads 66a–71a in contact with individual conductors 55–60. As the $S_1$ record is rotated, the traces constituting that record are reproduced and recorded as the first left-handed trace of each record 75 on the drums 62.

The $S_2$ record is the result of energization of source $S_2$ and the recording of signals received at geophones $G_1$–$G_6$. With the plurality of magnetic pickup heads 52 moved to reproduce the $S_2$ record and the gang switch 65 moved to connect recording heads 66b–71b in contact with individual conductors 55–60, the $S_2$ record traces will be reproduced and recorded as the second traces from the left of each of the records 75. Each of the records $S_3$–$S_6$ in sequence will be reproduced and their traces will be rearranged on the multitrace records 75 in sequence from left to right. The end result will be a new set of records 75, each record containing traces produced by the same geophone but in response to different sources, whereas the previous records 48 contained traces produced by different geophones in response to the same source. The traces on each of the new records will also represent center point alignments having common in-line positions along the survey line.

In FIG. 9 there is illustrated one form of apparatus for producing the desired beam-steered records. The apparatus illustrated in FIG. 9 includes separate magnetic recording systems 97 and 98 adapted for beam steering the rearranged records 75 of FIG. 8 to generate steered traces giving prominence to signals that arrived at determinable transverse angles of emergence and for arranging the steered traces to provide for the previously suggested types of display. The magnetic recording system 97 includes a plurality of drums 99 supported on a rotatable drive shaft 100 driven by suitable driving means, not shown. Each drum is suitably adapted for fastening a record 75 to its periphery.

FIG. 9 illustrates a plurality of scanning head matrices 101–106, each carried by its separate centrally pivoted head-moving mount 107–112. Each of the matrices includes a plurality of reproducing heads; for example, matrix 101 has individual heads 101a, 101b, 101c, 101d, 101e and 101f. As the head-moving mounts are rotated about their central pivot the individual reproducing heads are moved to a steering angle relative to an imaginary horizontal line across the rearranged records 75. Head-moving mounts 107–112 are rotated about their pivot point in a step-by-step manner by means of angular indexing drive 119. Angular indexing drive 119 is adapted to provide for mechanical positioning of the head-moving mounts in the desired number of distinct positions to search through the previously established transverse angles of emergence for directionally distinct seismic energy. After each revolution of drums 99, drive 119 is energized to cause on step of angular rotation of mounts 107–112 so as to shift the head matrices 101–106 to a new steering angle. The instantaneous signals read by all heads within the matrix are added at these preselected scanning angles across the records, and these added signals are transmitted through conductors 113–118 to second magnetic tape system 98. At tape system 98 these added or composited signals are recorded with respect to time as beam-steered traces.

It should be recognized that all of the records 75 are being simultaneously reproduced by respective scanning head matrices 101–106. When magnetic reading heads 101a–101f of scanning matrix 101, for example, are positioned as shown, they reproduce and composite the traces of the particular record 75 identified with the $X_1$ position along the survey line of FIG. 1. At the same time the remaining records 75 identified with in-line positions $X_2$–$X_6$ undergo similar reproduction and compositing by the head matrices 102–106.

It will be appreciated, in accordance with the above description, that the result after one rotation of the shaft 100 with one position of the pivotal head-moving mounts 107–112, is the production on drum 126 of a record consisting of separate traces, each trace corresponding to a position $X_1$–$X_6$ and all of the traces representing energy having the same emergence angle with respect to the vertical plane through the line of survey.

Recording of the beam-steered traces in magnetic system 98 is provided by recording head assembly 120 carried on a head-moving mount 121 slidably supported on bar means 122. The magnetic tape-carrying portions of system 98 constitute a series of drums 126–138 mounted on a shaft 139 mechanically connected to the drive shaft 100 of magnetic tape system 97. The head-moving mount 121 to which is attached the recording head assembly 120 is moved along bar means 122—from drum to drum—by movement of longitudinal indexing drive means 123. Drive means 123 is appropriately designed to provide longitudinal step-by-step movement of the head-moving mount 121 along bar means 122 as the pivotal head-moving mounts 107–112 are rotated to a new steering angle. The number of drums 126–138, or recording stations, is equal to the number of separate steering angles assumed by head matrices 101–106 as well as equal to the previous established number of transverse angles of emergence for the directionally distinct seismic energy.

It will now be appreciated that after shaft 100 has been rotated a number of times equal to the established number of steering angles, the pivotal head mounts having been moved to the accorded number of positions and after the head-moving mount 121 has moved through its corresponding positions, contacting drums 126, then 127, etc. to drum 138, the result will be a plurality of sets of directional traces, all of the directional traces in any one of the sets of traces having the same emergence angle, and the different sets from the different drums 126–138 being for different emergence angles.

The derived records produced on the drums 126 to 138 of FIG. 9 are somewhat similar in overall appearance to conventional seismic profile records in the sense that they are sets of side-by-side traces, and the individual traces from left to right on each record represent individual in-line positions. However, each trace on one of the derived records represents a composite of several traces of the original seismic data; it represents seismic energy received from a particular direction in the subsurface, denoted by a particular cross moveout. In the simplified case being described here for purposes of illustration, a set of traces from one of the drums 126 to 138 of FIG. 9 would contain six side-by-side traces, one for each of the in-line positions $X_1$, $X_2$ . . . $X_6$ of FIG. 1. Each of the six derived traces would represent a composite of six original traces, each original set of six having a common in-line position the same as that of the derived trace, and all of the six derived traces would represent energy received from a common specified direction out of the earth. In practice the common direction would be designated by a common cross moveout in milliseconds (e.g., 60 milliseconds).

If in the beam steering operation thirteen different directions in the earth were chosen for examination (say, six on one side of the vertical direction, the vertical direction itself, and six on the other side of the vertical direction) there would be produced, as indicated by the lower drums 126 to 138 of FIG. 9, thirteen different six-trace records, each of the thirteen representing a distinct cross direction into and out of the earth, but all of the thirteen containing six derived directional traces representing the same six in-line locations $X_1$, $X_2$, . . . $X_6$. So the original 36 traces, from 6 shots and 6 geophones, would now be represented by 13 sets of 6 traces, or 78 traces in all.

In the actual field practice of the present invention the numbers may be much larger than those being given here for illustration. For instance, it is common practice to have at least 24 geophone groups in a single spread of detectors, instead of six. As many as twelve shots could be used in each cross spread of sources, and data may be plotted out for two dozen cross moveout values. Furthermore, many spreads, each consisting of 24 geophone groups, and a cross of shots are used in a seismic survey. So the total number of traces produced in an actual survey several miles long is of the order of a few thousand.

Returning to the illustration of the present description, and particularly to the thirteen sets of six traces each produced on the drums of FIG. 9, it will be appreciated by one skilled in seismic exploration that at least one of the thirteen sets could be used, just as a conventional profile of traces is used, to derive the in-line moveout of any event that appears prominently on the set of traces. (The in-line moveout is, by usual definition, the difference between the time that the wavelet representing the event arrived on the first trace, and the time that the wavelet arrived on the last trace, of a set.) However, in conventional seismic exploration, the in-line moveout so obtained has an ambiguity. Except in the event that the seismic energy in question actually traveled in, or near, the vertical plane containing the line of survey, the conventionally determined in-line moveout does not fix the actual direction from which a wavelet arrived. (Strictly speaking, it only places the wave ray path somewhere in the surface of a cone whose axis is the line of survey, and whose vertex angle is the complement of the emergence angle corresponding to the in-line moveout.)

In the present invention, the true direction of wavelet arrival is fixed by two different types of moveout determination, to obtain two components of moveout perpendicular to each other, and thereby to fix the actual direction from which a wavelet came, without ambiguity.

Using the thirteen sets of traces, each set representing a different cross moveout for the same six in-line positions, it is most logical to determine cross moveout first, by first searching all thirteen sets for one or more reliable events, and then searching for the particular set that best shows each one of the one or more reliable events. This may be done by apparatus similar to that described in U.S. Pat. 3,149,302, W. W. Klein et al., issued Sept. 15, 1964, for "Information Selection Programmer Employing Relative Amplitude, Absolute Amplitude and Time Coherence," and it is, of course, preferably done by such high speed searching means, but for explanatory purposes in this specification, the searching step may be thought of as if it were performed by human inspection, and it is entirely possible to perform it that way.

When one has found, say, one reliable event, unmistakably evidenced on neighboring traces in one of the thirteen sets of traces representing the same six in-line positions, and also unmistakably evidenced on one or more neighboring sets of the thirteen, and when one has found which of the sets displays that event most strongly, one has, by that act, also found the cross moveout of that event, because the individual sets correspond to individual cross moveouts. One can proceed further to interpolate to moveouts between the original moveouts of the set.

After the step is taken of determining the cross moveout in the above manner, the next step follows quite naturally, if the process is being carried out by human inspection, because it will become evident that of all the derived traces in the thirteen sets, the ones that show a chosen event most clearly, and which by their mere selection fix the cross moveout, are also the best traces to use in determining the in-line moveout. So this set of traces, which has been prepared and selected in an unconventional manner, is now used as one would use a conventional profile of seismic traces. The in-line moveout is determined merely by measuring the disparity in arrival time of the chosen event between, say, the left-hand trace and the right-hand trace of the set.

The above paragraphs complete the description of the essence of the present invention, an improved method for determining in-line and cross moveout.

It will be appreciated by one skilled in the seismic art that knowledge of in-line and cross moveout is essential to the determination of the true three-dimensional aspect of structures in the subsurface. However, that knowledge alone is not sufficient, except when it can reasonably be assumed that the subsurface velocities down to the formations of interest are substantially constant. In the usual real case, the velocity increases rather irregularly, but usually monotonically, with depth. If one has a knowledge of this velocity variation, one can compute the curved path that must have been taken by a wave that emerged at the surface with a given in-line moveout and a given cross moveout. Computation methods for doing this are described in the literature (see e.g. M. M. Slotnick: "Lessons in Seismic Computing," Society of Exploration Geophysicists (1959)). These computation methods will usually show that the subsurface area that produced a given reflection has a greater dip that it would have if it were normal to the emergent ray path of the wave at the surface. The desired ultimate numerical results from a computation beginning with the in-line and cross moveout of an event, using an assumed, or otherwise derived velocity-versus-depth function, are the depth, dip, and dip azimuth of the subsurface bed that produce that event. The full, final numerical description of the part of a subsurface structure that produced a certain event would contain at least five numbers, representing the subsurface depth, dip, and dip azimuth and two horizontal coordinates (the map position).

The ultimate objective of a method of reflection seismology like the one being described here may be said to be some sort of representation of the subsurface strata as curved surfaces in three-dimensional space. Conceivably, every reflecting area that is evidenced by an event on the seismic traces can be given the five coordinates mentioned above and all the reflecting areas could be modeled in a three-dimensional model. However, in practice, one usually stops short of that objective for reasons of convenience and economy. In the practice of the present invention, the usual custom has been to carry the data processing to the point at which one can construct one or the other of two main types of two-dimensional representation. One type is a plan view on paper, or film, of part of the subsurface showing short straight lines representing places from which reflections were received, the lines are oriented as "strike" lines in the usual geological sense, and they are labeled with the numerical values of their associated dips and of their associated depths. When enough of these "strike bars" are computed and plotted, and when they are linked up by judicious interpolating lines, they form a sort of contour map of the particular subsurface stratum chosen to be represented. This type of plan view of the subsurface, when it is produced by the method of the present invention, is more reliable than views of its type produced by prior art methods. However, its final appearance, including the alphanumecical labeling of its line elements, is not necessarily distinctive over similar plan views of the prior art.

The second main type of two-dimensional representation of data from the method of the present invention does retain an evident distinction in the labeling of its elements. This is the "time-section" view, which in the prior art would represent an elevational, cross-sectional view of the earth cut by a vertical plane containing the line of survey. It is common practice to place a plurality of conventional seismic records side-by-side so that the individual traces, representing individual positions along the line of survey, continue the representation uninterruptedly from record to record over many dozens, or many hundreds, of detector spacing intervals. When records are placed side by side this way, the prominent wiggles in the individual traces tend to be continued across their respective records, and the prominent wiggles throughout the records tend to be continued across larger portions of the whole section, so that the sectional display appears to represent the strata themselves, as they might appear in a vertical cross section through the earth.

The method of the present invention permits a new kind of display to be made which superficially appears similar to the conventional cross section, but which actually represents information in controlled directions in front of and behind the vertical plane containing a line of survey. Sets of traces resulting from the operations described with reference to FIG. 9 may be laid side by side. In the numerical terms of the previously used illustrations a set of six traces having a common cross moveout but representing different successive inline positions would have laid next to it a second set of six traces with a second and different common cross moveout and representing different successive in-line positions stepwise continuous from those of the first set. A third set of six traces having a third common cross moveout and representing further successive in-line positions would be laid beside the second set, etc., to produce a quasi cross-sectional display of many sets of six traces all laid side by side. The distinction from prior art cross sections would be that each set of six traces would represent information that came from a designated direction, behind, within, or in front of, the vertical plane through the earth containing the line of survey, and each set of six traces would retain a label indicating its direction with respect to that plane.

Instead of representing a cross-sectional plane this type of "quasi cross section" actually represents a kind of curtain in space, whose top may be thought of as fixed to a rod in the position of the line of survey, but whose bottom may wave backward or forward with respect to the vertical plane through the supporting rod, the displacement of each wave being labeled.

It will be appreciated that the extreme form of this kind of a quasi cross section would be composed of sets having only one member per set. In other words, each trace might have a different cross moveout from its preceding trace, and be so labeled.

Figure 10:
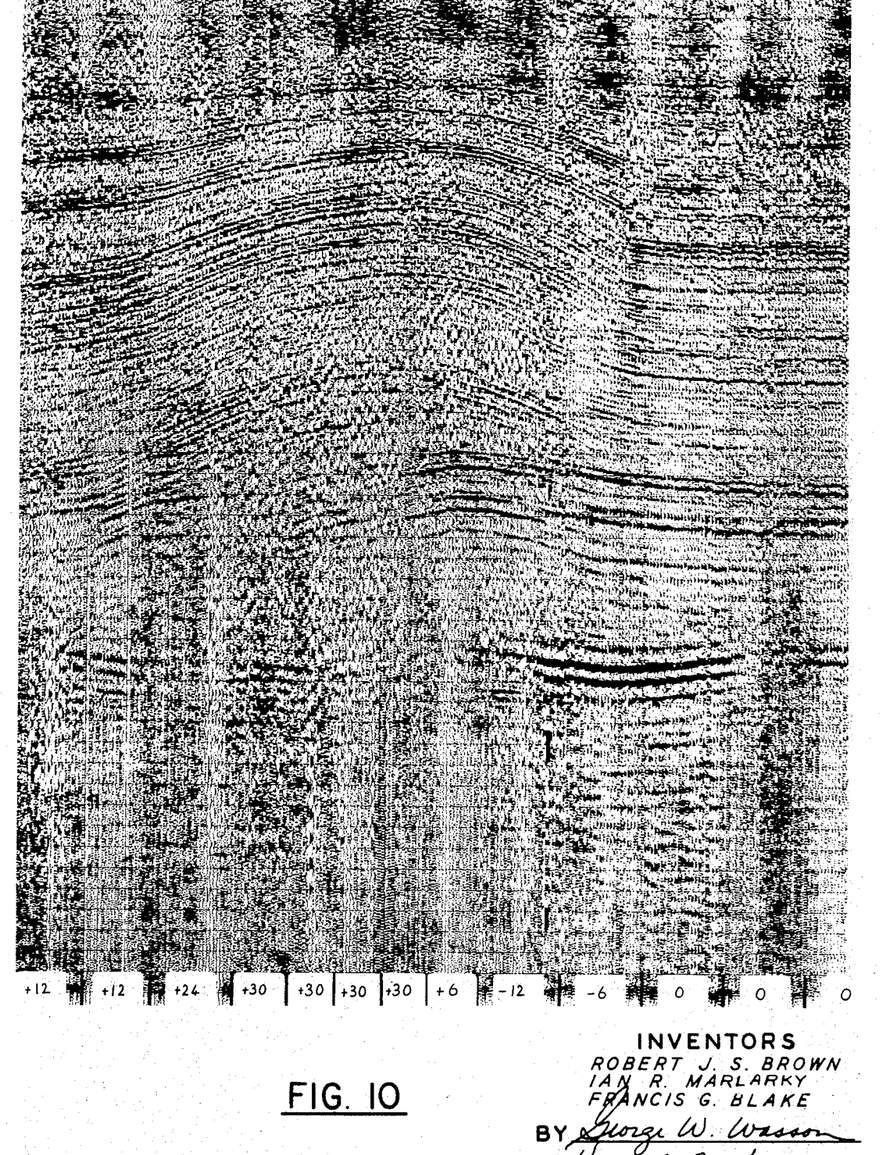
FIG. 10 is a quasi cross section through an earth formation such as can be produced in accordance with the method of the present invention.

FIG. 10 is a reproduction of an actual quasi cross section composed of side-by-side sets of generally 24 traces per set, each set being labeled with its individual cross moveout. It should be noted that the cross section includes sets of traces having different directions or moveouts in the cross direction as marked at the bottom of the traces. Notably, beginning at the right-hand side, the first group of traces represents reflections having zero moveout or generally within the vertical plane that includes the line of survey. Proceeding then toward the left, the next sections have moveouts in a minus direction, indicating reflections coming from directions behind the plane including the line of survey. The remainder of the traces proceeding leftwardly have positive moveouts and represent reflections coming from directions in front of the plane including the line of survey. The FIG. 10 cross section gives a three-dimensional aspect to the displayed data.

FIG. 11 is a display of seismic information derived in the conventional manner employing a single source and a geophone array to produce continuous subsurface coverage across an earth formation. The cross section illustrated in FIG. 11 is derived from the same formation as the cross section illustrated in FIG. 10. The improved prominence of reflections in the FIG. 10 record with respect to those shown in FIG. 11 should be noted.

Figure 12:
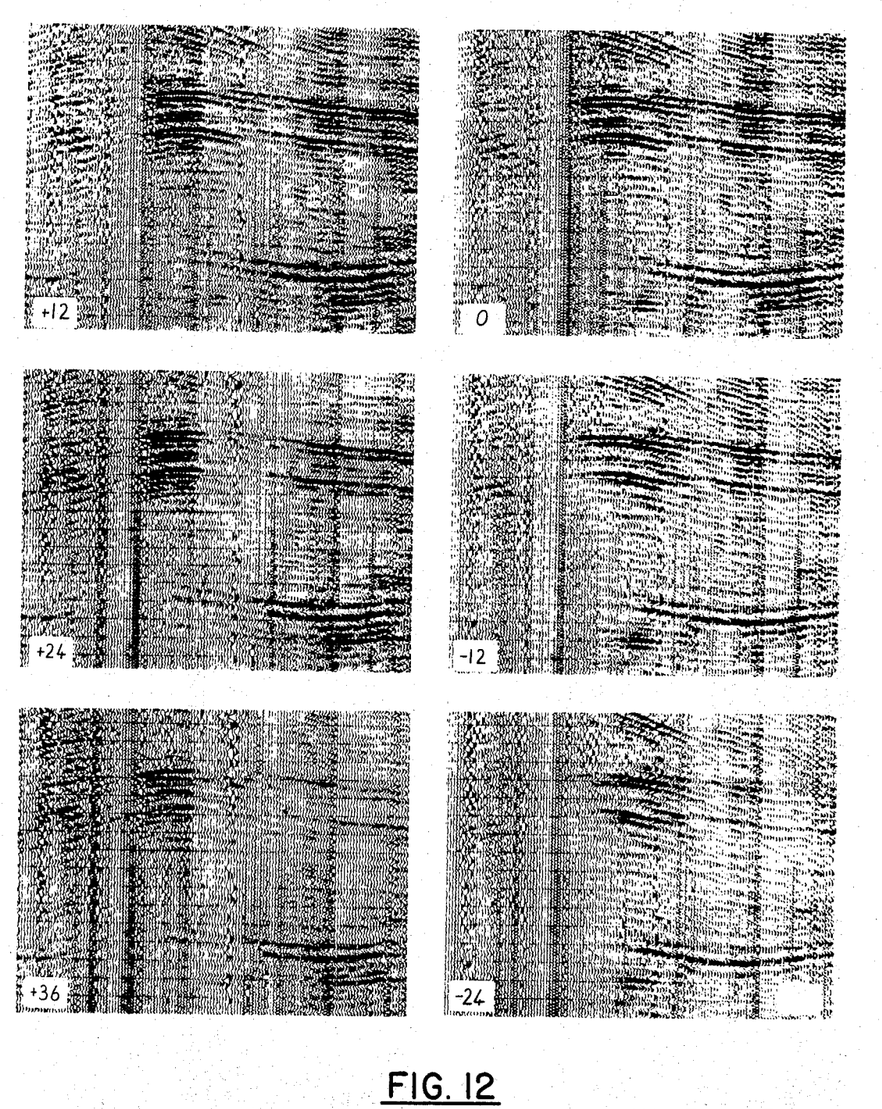
FIG. 12 is a group of sets of side-by-side directional traces for a portion of the earth formation depicted in FIGS. 10 and 11 with each set having a different cross-moveout.
Figure 13:
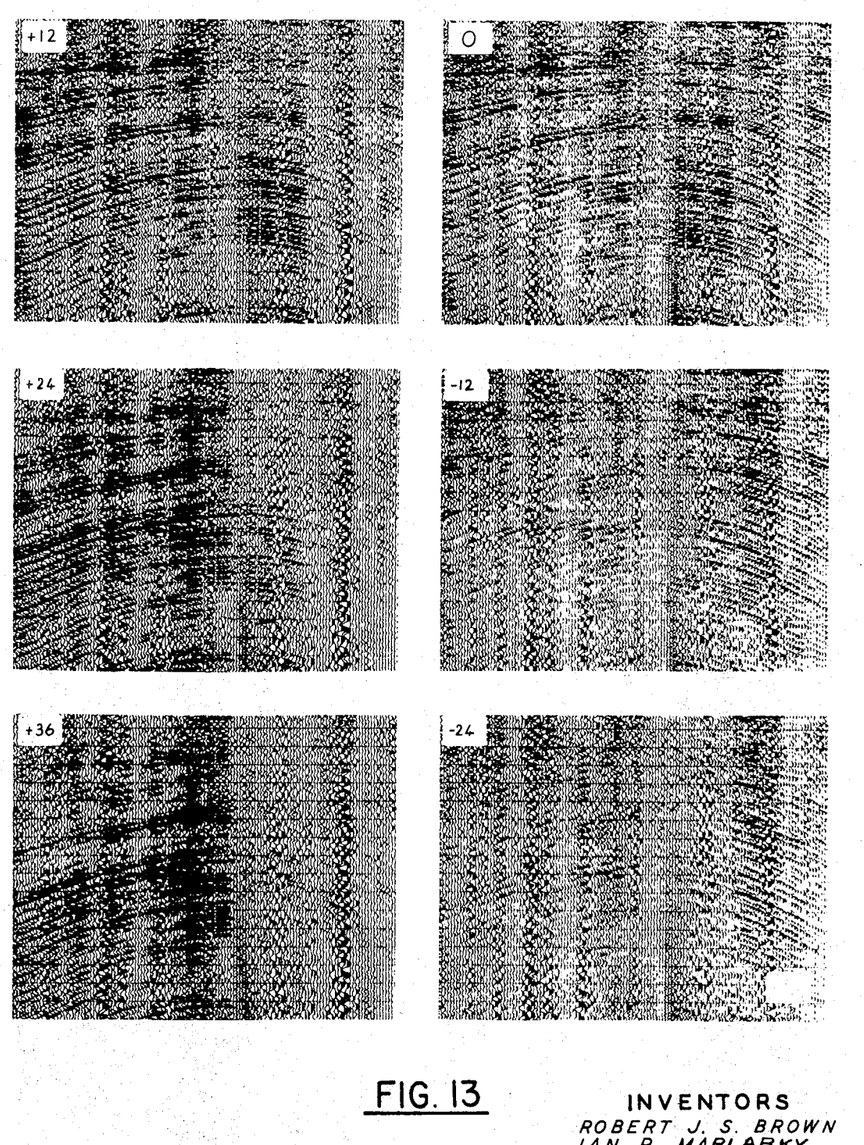
FIG. 13 is similar to FIG. 12 and illustrates a group of sets of side-by-side directional traces into another portion of the earth formation depicted in FIGS. 10 and 11.

FIGS. 12 and 13 are actual parts of the information that is derived in the performance of the method of the present invention. These figures graphically demonstrate the process of determining the most prominent identification for a subsurface seismic event. Referring first to FIG. 12, it should be seen that the six portions of this figure are all cross-section-like displays representing a small portion of the subsurface that is ultimately to be represented in FIG. 10. The individual frames of FIG. 12 cover a wide cross-moveout range (from −24 to +36). The particular events chosen to be emphasized in the corresponding part of FIG. 10 do not all show up best at any one of the moveouts of FIG. 12. The events toward the left side show up best at the high positive moveouts and those at the right show up best at low moveouts, and the labels at the bottom of FIG. 10 show what different moveouts were used. The part of FIG. 10 corresponding to the frames of FIG. 12 shows its important events more prominently than does any one of the individual frames of FIG. 12.

Similar remarks apply to the individual frames of FIG. 13, and the part of FIG. 10 to which they correspond.

It should be apparent that an additional display could be produced with each trace individually selected as the directional trace most prominently displaying certain seismic events at the particular set of center points perpendicular to the line of the survey. Such a system would, of course, require identification for each of the selected records. It should, therefore, be apparent that the quasi cross section of grouped traces as shown in FIG. 10 is more easily produced and interpreted even though individual trace selections might be substantially more accurate.

It is also evident that the in-line and cross dip of a seismic event may be determined by systematically beam steering a set of traces representing center point alignments perpendicular to the line of the survey for at least two adjacent sets of traces. After an event has been identified in one of the beam-steered sets, that same event may be identified in the adjacent beam-steered set of traces and any disparity in arrival time can be noted. The selected directional trace will give the cross moveout from which the cross dip of the reflector which the event represents can be determined with knowledge of the velocity of seismic energy through the earth formations. The disparity in time between the events on at least two adjacent traces will give the in-line dip of the event.

Figure 5A:
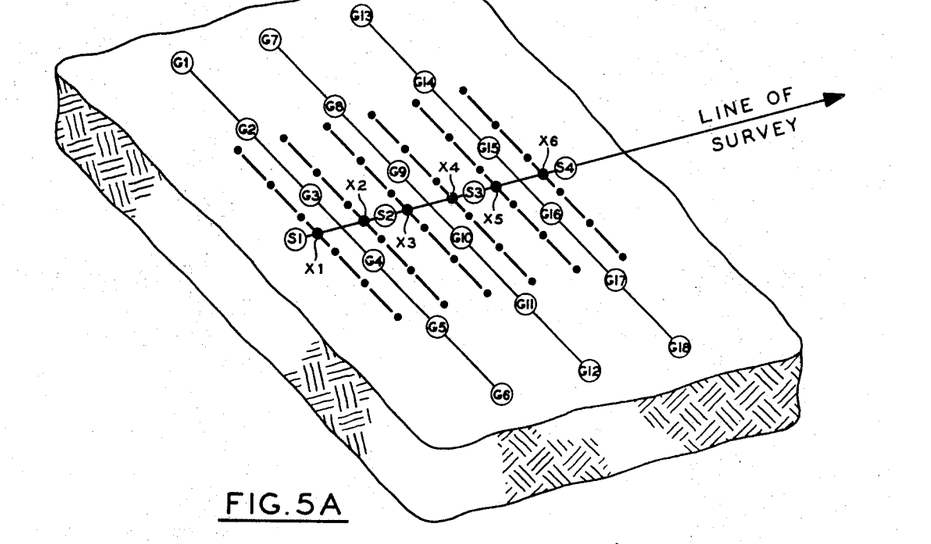
FIGS. 5a and 5b illustrate alternative areal arrays of geophones and seismic sources for obtaining seismic data in accordance with the present invention.
Figure 5B:
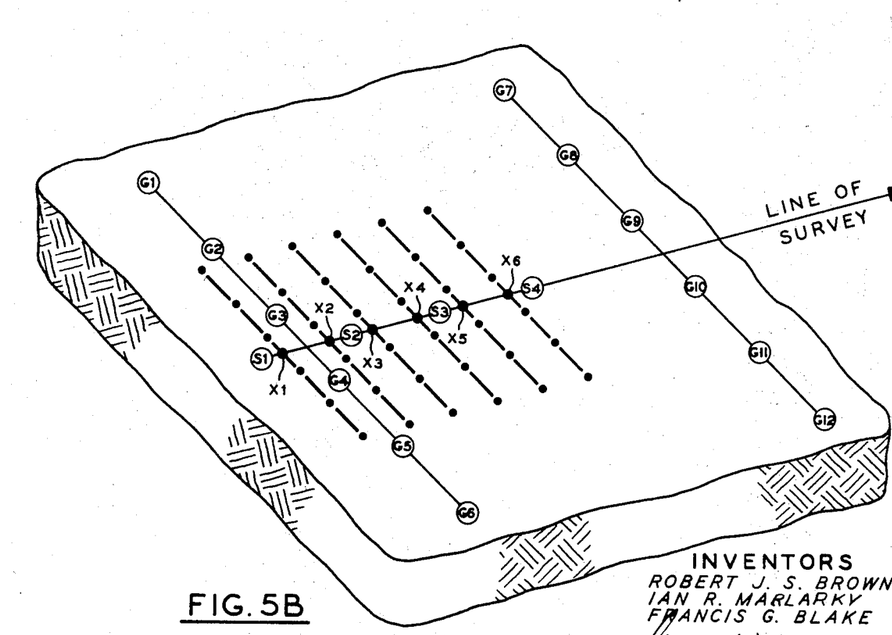

It will be appreciated from the foregoing description that the traces to be processed according to the invention may be traces produced from geophone and source arrays other than that pictured in FIG. 1. For example, the geophone and source arrays illustrated in FIGS. 5a and 5b produce traces of sufficient number and locations for processing in accordance with the present invention. As shown, the geophone array $G_1$–$G_6$ is aligned perpendicular to the line of survey but the sources $S_1$–$S_6$ are aligned parallel with survey line 22. However, as the sources are energized, in sequence, the same grid pattern of center point locations illustrated in FIG. 1 emerges.

The method of the present invention can also be practiced with geophone and source arrays that are other than perpendicular to each other so long as the center points between the sources and the detectors produce a grid of center points that will permit sets of traces representing the center points to be beam steered for directional information. The substantially perpendicular geophone and source alignment provides for the simplest office processing procedures and is the preferred field procedure unless convenience dictates otherwise.

Oblique or other than substantially perpendicular alignments of the in-line and cross arrays are also useful in accordance with the present invention. All that is really required is that center points between the sources and detectors establish a substantially uniform, two-dimensional grid of center points. For ease in data processing it is preferred that there be an alignment of center points substantially perpendicular to the line of survey; however, data from center points having an oblique alignment can be processed in accordance with known modifications of the data processing techniques herein outlined.

Techniques employing geophone and source arrays other than perpendicular to each other are more fully described and claimed in the copending applications of Roger D. Judson et al. filed on or about Dec. 30, 1968, for "Method of Attenuating Multiple Seismic Signals in the Determination of In-Line and Cross Dips Employing Cross Steered Seismic Data" and of Aubra E. Tilley et al. filed on or about Dec. 30, 1968, for "Method of Collecting Seismic Data of Strata Underlying Bodies of Water."

While certain preferred embodiments of the invention have been specifically disclosed, it should be understood that the invention is not limited thereto as many variations will be readily apparent to those skilled in the art and the invention is to be given its broadest possible interpretation within the terms of the following claims:

We claim:
1. A seismic data collecting and processing method using automated data processing means for producing information related to the stratigraphy of strata below the surface of an earth formation comprising the steps of:
  (a) positioning an array of seismic sources and seismic detectors such that the center points located substantially along imaginary lines between all possible source-detector pairs form a two-dimensional grid of center points, of substantially uniform center point density, containing sets of center points aligned substantially perpendicular to a line of survey,
  (b) separately and sequentially exciting each of said sources to produce a plurality of separate seismic disturbances,
  (c) separately recording the output signals of each of said detectors following excitation of each of said sources, and then by operation of automated data processing means statically and dynamically correcting the detected signals to produce a plurality of corrected traces, each trace associated with an individual center point in said grid of center points, and sets of said traces being associated with a plurality of individual sets of center points, with each such individual set being aligned substantially perpendicular to said line of survey and with said sets being arranged in a series spaced longitudinally along said line of survey,
  (d) by operation of automated data processing means beam steering said sets of traces associated with said individual sets of center points aligned perpendicular to said line of survey to produce sets of directional traces, and
  (e) by operation of automated data processing means repeatedly beam steering said individual sets of center point traces along said line of survey, proceeding from at least one individual set of center point traces to at least another.

2. A seismic data collecting and processing method using automated data processing means for producing information related to the stratigraphy of strata below the surface of an earth formation comprising the steps of:
  (a) positioning an array of seismic sources and seismic detectors such that the center points located substantially along imaginary lines between all possible source-detector pairs form a two-dimensional grid of center points, of substantially uniform center point density, containing sets of center points aligned substantially perpendicular to a line of survey,
  (b) separately and sequentially exciting each of said sources to produce a plurality of separate seismic disturbances,
  (c) separately recording the output signals of each of said detectors following excitation of each of said sources, and then by operation of automated data processing means, statically and dynamically correcting the detected signals to produce a plurality of corrected traces, each trace associated with an individual center point in said grid of center points, and sets of said traces being associated with a plurality of individual sets of center points, with each such individual set being aligned substantially perpendicular to said line of survey and with said sets being arranged in a series spaced longitudinally along said line of survey, (d) by operation of automated data processing means beam steering said sets of traces associated with said individual sets of center points aligned perpendicular to said line of survey, to produce sets of directional traces, with directional traces of each such set of directional traces being associated with a common in-line position and with each of said directional traces of each such set of directional traces having a different cross moveout, and (e) by operation of automated data processing means repeatedly beam steering said individual sets of center point traces along said line of survey, proceeding from at least one individual set of center point traces to at least another.

3. A seismic data collecting and processing method using automated data processing means for producing information related to the stratigraphy of strata below the surface of an earth formation comprising the steps of:

(a) positioning an array of seismic sources and seismic detectors such that the center points located substantially along imaginary lines between all possible source-detector pairs form a two-dimensional grid of center points, of substantially uniform center point density, containing sets of center points aligned substantially perpendicular to a line of survey, (b) separately and sequentially exciting each of said sources to produce a plurality of separate seismic disturbances, (c) separately recording the output signals of each of said detectors following excitation of each of said sources, and then by operation of automated data processing means, statically and dynamically correcting the detected signals to produce a plurality of corrected signals to produce a plurality of corrected traces, each trace associated with an individual center point in said grid of center points, and sets of said traces being associated with a plurality of individual sets of center points, with each such individual set being aligned substantially perpendicular to said line of survey, and with said sets being arranged in a series spaced longitudinally along said line of survey, (d) by operation of automated data processing means beam steering said sets of traces associated with said individual sets of center points aligned perpendicular to said line of survey to produce sets of directional traces, (e) by operation of automated data processing means, repeatedly beam steering said individual sets of center point traces along said line of survey, proceeding from at least one individual set of center point traces to at least another, and (f) by operation of automated data processing means, grouping said directional traces so that all of said directional traces in any one grouped set have the same direction, with respect to a vertical plane passing through said line of survey, and each of said grouped sets of directional traces has a different direction with respect to said plane.

4. A seismic data collecting and processing method using automated data processing means for producing information related to the stratigraphy of strata below the surface of an earth formation comprising the steps of:

(a) positioning an array of seismic sources and seismic detectors such that the center points located substantially along imaginary lines between all possible source-detector pairs form a two-dimensional grid of center points, of substantially uniform center point density, containing sets of center points aligned substantially perpendicular to a line of survey, (b) separately and sequentially exciting each of said sources to produce a plurality of separate seismic disturbances, (c) separately recording the output signals of each of said detectors following excitation of each of said sources, and then by operation of automated data processing means, statically and dynamically correcting the detected signals to produce a plurality of corrected traces, each trace associated with an individual center point in said grid of center points, and sets of said traces being associated with a plurality of individual sets of center points, with each such individual set being aligned substantially perpendicular to said line of survey, and with said sets being arranged in a series spaced longitudinally along said line of survey, (d) by operation of automated data processing means beam steering said sets of traces associated with said individual sets of center points aligned perpendicular to said line of survey to produce sets of directional traces, (e) by operation of automated data processing means, repeatedly beam steering said individual sets of center point traces along said line of survey, proceeding from at least one individual set of center point traces to at least another, and (f) by operation of automated data processing means, grouping said directional traces so that all of said directional traces in any one grouped set consists of at least two directional traces with a common cross moveout and different in-line positions, the different grouped sets having different cross moveouts.

5. The method of claim 1 wherein said sources and detectors comprise a plurality of geophones aligned with said line of survey and a plurality of seismic sources aligned perpendicular to said line of survey.

6. The method of claim 1 wherein said sources and detectors comprise a plurality of seismic sources aligned with said line of survey and a plurality of geophones aligned perpendicular to said line of survey.

References Cited

UNITED STATES PATENTS

| | | | |
|---|---|---|---|
| 2,427,421 | 9/1947 | Rieber | 340—15.5 X |
| 2,894,596 | 7/1959 | Flatlow et al. | 340—15.5 X |
| 3,327,287 | 6/1967 | Ball et al. | 340—15.5 |
| 3,346,068 | 10/1967 | Woods et al. | 340—15.5 X |
| 3,363,229 | 1/1968 | Miller et al. | 340—15.5 |

RODNEY D. BENNETT, Primary Examiner

D. C. KAUFMAN, Assistant Examiner

PO-1050 (5/69)

UNITED STATES PATENT OFFICE
CERTIFICATE OF CORRECTION

Patent No. 3,529,282      Dated September 15, 1969

Inventor(s) ROBERT J. S. BROWN ET AL

It is certified that error appears in the above-identified patent and that said Letters Patent are hereby corrected as shown below:

Col. 4, line 28, "down up" should read --down and up--

Col. 5, line 69, "traces then" should read --traces will then--

Col. 8, line 55, "cause on" should read --cause one--

Col. 9, line 23, "previous" should read --previously--

Col. 11, line 60, "alphanumecical" should read --alphanumerical--

Signed and sealed this 11th day of May 1971.

(SEAL)
Attest:

EDWARD M. FLETCHER, JR.      WILLIAM E. SCHUYLER, JR.
Attesting Officer      Commissioner of Patents

PO-1050
(5/69)

UNITED STATES PATENT OFFICE
CERTIFICATE OF CORRECTION

Patent No. 3,529,282            Dated September 15, 1970

Inventor(s) ROBERT J. S. BROWN ET AL

It is certified that error appears in the above-identified patent and that said Letters Patent are hereby corrected as shown below:

Col. 1, line 6, delete "Marlarky" and substitute --Malarky--

Col. 3, line 52, delete "4-4" and substitute --3-3--

Col. 3, line 58, delete "2" and substitute --1--

Col. 3. line 71, delete "2" and substitute --1--

In the Drawings, Sheets 1-10, under "INVENTORS", delete "Marlarky" and substitute --Malarky--

Signed and sealed this 1st day of October 1974.

(SEAL)
Attest:

McCOY M. GIBSON JR.            C. MARSHALL DANN
Attesting Officer               Commissioner of Patents